(12) United States Patent
Stojanovski

(10) Patent No.: US 6,644,152 B1
(45) Date of Patent: Nov. 11, 2003

(54) MILLING TOOL HOLDER

(76) Inventor: Stojan Stojanovski, 13300 W. Star Dr., Shelby Twp., MI (US) 48315

( * ) Notice: Subject to any disclaimer, the term of this patent is extended or adjusted under 35 U.S.C. 154(b) by 0 days.

(21) Appl. No.: 10/107,121

(22) Filed: Mar. 28, 2002

(51) Int. Cl.[7] .............................. B23B 29/00; B23B 5/20
(52) U.S. Cl. ............................................ 82/158; 82/160
(58) Field of Search ............................. 279/83; 407/34, 407/40, 42, 46, 53, 54

(56) References Cited

U.S. PATENT DOCUMENTS

| | | | | |
|---|---|---|---|---|
| 4,511,294 A | * | 4/1985 | Grunsky et al. | 408/232 |
| 5,378,091 A | * | 1/1995 | Nakamura | 409/132 |
| 5,468,102 A | * | 11/1995 | Stojanovski | 409/234 |
| 5,613,693 A | * | 3/1997 | Ramunas | 279/76 |
| 5,716,056 A | * | 2/1998 | Bokram | 279/46.2 |
| 6,299,394 B1 | * | 10/2001 | Stojanovski | 409/234 |
| 6,394,466 B1 | * | 5/2002 | Matsumoto et al. | 279/103 |

* cited by examiner

Primary Examiner—A. L. Wellington
Assistant Examiner—Dana M. Ross
(74) Attorney, Agent, or Firm—Charles W. Chandler

(57) ABSTRACT

A millin tool holder includes a tool holder body having a tool shank opening. The tool shank has an annular shoulder seated on a shoulder on the tool holder. A pair of confronting slots form an opening for receiving a pin which prevents the tool head from rotating with respect to the body.

6 Claims, 3 Drawing Sheets

MILLING TOOL HOLDER

BACKGROUND AND SUMMARY OF THE INVENTION

This invention is related to a two-part milling tool holder which includes a body adapted to be mounted on a milling tool base. A replaceable head for supporting a pair of indexable inserts has a shank received in an opening in the body. The head can be replaced with another head of the same or a different style.

Milling tool inserts are commonly mounted on the end of an elongated tool holder. It is desirable in some cutting situations to use one type of insert for heavy milling and then another insert for cutting a radius or the like. Occasionally, the cutter head becomes damaged or worn. Commercially available heads generally must either be scrapped or repaired. Most of the expense in making the holder is in the body of the holder. Further, replacing a complete toll holder is time consuming.

Prior art related to tool holders such as for milling inserts may be found in my U.S. Pat. Nos. 5,468,102 issued Nov. 21, 1995 for "Milling Tool Holder"; and 6,299,394 issued Oct. 9, 2001 for "Milling Tool Holder".

The broad purpose of the present invention is to provide an improved milling tool holder of the type in which a body adapted to be supported on a milling machine base, is connected to a head that supports a pair of indexable inserts. The head has a shank received in a bore in the body.

A pair of threaded fasteners mounted on the body have their inner ends engaging the shank to cam a shoulder on the head toward a shoulder on the body.

The arrangement is such that the user can readily exchange the head whenever it has become damaged, worn, or needs to be exchanged to accommodate a head having a different cutting configuration.

Although the fasteners prevent the shank from rotating with respect to the body, my prior patent disclosed additional means for preventing such rotation. My U.S. Pat. No. 5,468,102 used a pin in the shank-receiving hole, which was received in the slot in the end of the shank when it was inserted in the hole.

The present invention discloses an arrangement that accommodates a heavier torque required by high speed machines for a heavier cut. In this case, the body has a shoulder around the shank-receiving hole. The tool has a shoulder around the shank that seats on the shoulder on the body. One of the channels has a pair of channels aligned along an axis that passes through. the center of the shank-receiving hole. The other shoulder has a pair channels so that the two shoulders combine to form a pair of cylindrical openings.

A cylindrical pin or key is mounted in each cylindrical opening. Each pin is attached to a channel in one of the shoulders.

When the tool shoulder is mounted on the body shoulder in face-to-face contact, the pins prevent the tool from rotating with respect to the body, and increase the torque transmitting properties of the tool holder. This provides a safety feature in the event that the two threaded fasteners should fail to prevent the tool from rotating with respect to the body.

A single pin embodiment is also disclosed. Each shoulder has a single channel. When the head is mounted on the body, the pin attached to one of the shoulders is received in the channel in the other shoulder. This arrangement ensures that the fastener openings in the body are aligned with the openings in the shank.

Still further objects and advantages of the invention will become readily apparent to those skilled in the art to which the invention pertains upon reference to the following detailed description of the drawings.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
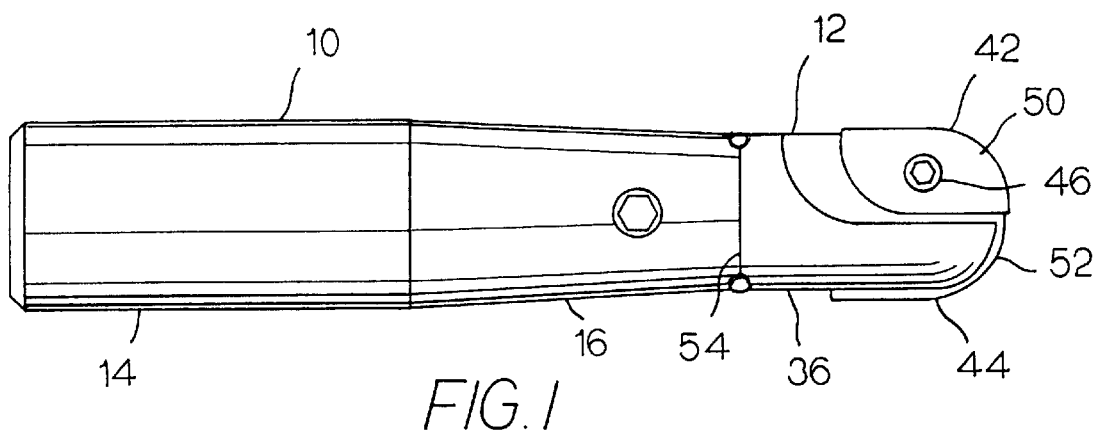
FIG. 1 is a longitudinal view of a milling tool holder illustrating the preferred embodiment of the invention.
Figure 2:
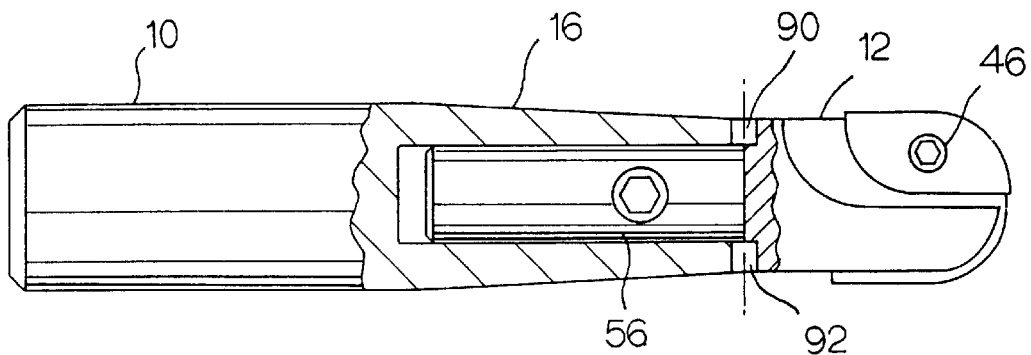
FIG. 2 is a view similar to FIG. 1, but in which the body is partially shown in section.

Referring to the drawings, a preferred tool holder comprises an elongated steel body 10 and an elongated steel tool head 12. The body is adapted to be mounted in the conventional manner on a milling machine base. Body 10 has a cylindrical inner end 14 and a tapered outer end 16. The body has an outer annular shoulder 18 formed around the opening of an internal shank-receiving bore 20. Bore 20 has a cylindrical inner surface formed about a longitudinal axis 22 which also corresponds with the longitudinal axis of both body 10 and head 12.

For illustrative purposes, bore 20 has a depth of about 2", slightly less than one-half the overall length of body 10, which has a length of about 4.25".

Bore 20 has a diameter of about 3/16".

The body has a pair of fastener-receiving threaded openings 28 and 30. The two openings are formed about parallel axes 32 and 34 which are disposed at right angles to and intersect longitudinal axis 22. Openings 28 and 30 are longitudinally spaced about 3/8".

Head 12 has an enlarged slotted outer end 36 for mounting indexable inserts 42 and 44. Each insert is releasably fastened to the head by a fastener means 46. The inserts are relatively flat, with cutting edges 50 and 52, respectively. The axes of fastener-receiving openings 28 and 30 are disposed perpendicular to the planes of the inserts.

Head 12 has an annular seat 54, and an elongated cylindrical shank 56, received in bore 20. Shank 56 has a length less than the depth of bore 20, and a diameter forming a snug sliding fit in the bore.

The shank has a pair of counter-drilled openings or recesses 60 and 62 which are slightly longitudinally offset from fastener-receiving openings 28 and 30, respectively, when the shank has been fully received in bore 20. A socket head fastener 64 is threadably received in opening 28, and a second socket head fastener 66 is threadably received in fastener opening 30.

Figure 4:
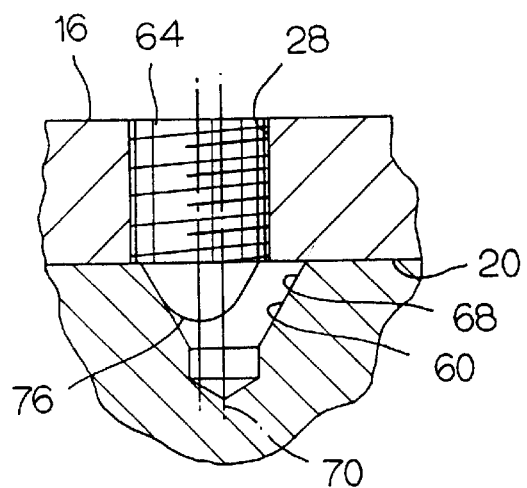
FIG. 4 is an enlarged view showing the manner in which the fasteners am the shank toward its fully-seated position.

The two counter-drilled openings are identical except with respect to their location along the shank. Openings 28 and 30 are located on opposite sides of the shank. A typical counter-drilled opening and its fastener is illustrated in FIG. 4. Counter-drilled opening 60 has a concave, frusto-conical surface 68 adjacent the inner end of fastener opening 28. Axis 70 of counter-drilled hole 60 is offset from axis 72 of opening 28. This distance is somewhat exaggerated in FIG. 4 to show that the axis of each counter-drilled opening is closer to shoulder 18 of the body than the axis of the corresponding fastener-receiving opening.

Fastener 64 has a rounded inner end 76 that slidably engages frusta-conical surface 68. As fastener 64 is threadably inserted into opening 28, inner end 76 engages surface 68 to cam the shank toward the bottom end of the bore, thereby causing shoulder 54 to tightly abut shoulder 18.

Similarly, the rounded inner end of fastener 66 slidably engages the frusto-conical surface of counter drilled opening 62 to cam the shank toward the bottom end of the bore.

The diameter of the shank very snugly fits the internal surface of bore 20, and shoulder 54 tightly abuts shoulder 18 to locate the inserts in a proper cutting position when the head is replaced with a different pair of inserts.

Figure 5:
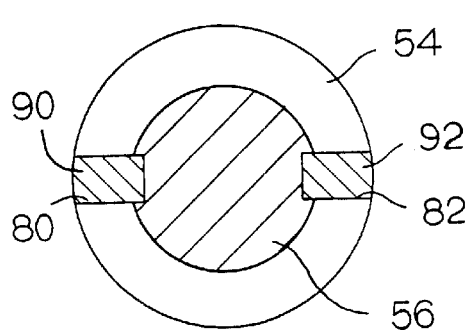
FIG. 5 is an enlarged sectional view as seen along lines 5—5 of FIG. 3.
Figure 6:
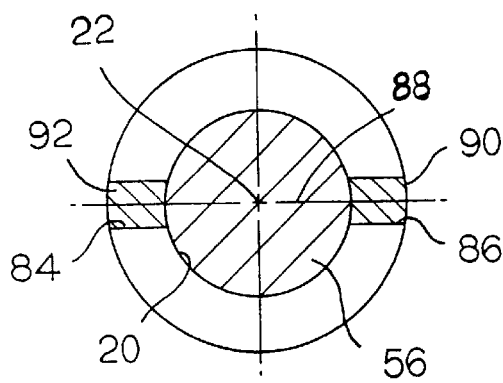
FIG. 6 is a view as seen along lines 6—6 of FIG. 3.

Referring to FIGS. 5 and 6, shoulder 54 of the tool head has a pair of aligned semi-cylindrical channels 80 and 82 on opposite sides of the shank, and aligned to intersect the axis of the shank and of bore 20. Similarly, referring to FIG. 6, the body has a pair of semi-cylindrical openings 84 and 86 formed along an axis 88 that intersects axis 22 of the shank. Channels 84 and 86 are also semi-cylindrical and mate with the corresponding channels on the body when shank 56 is inserted in the shank-receiving opening 20. Axis 88 of the channels is disposed at right angles to a plane containing the shank axis and the axis of threaded openings 28 and 30.

Figure 3:
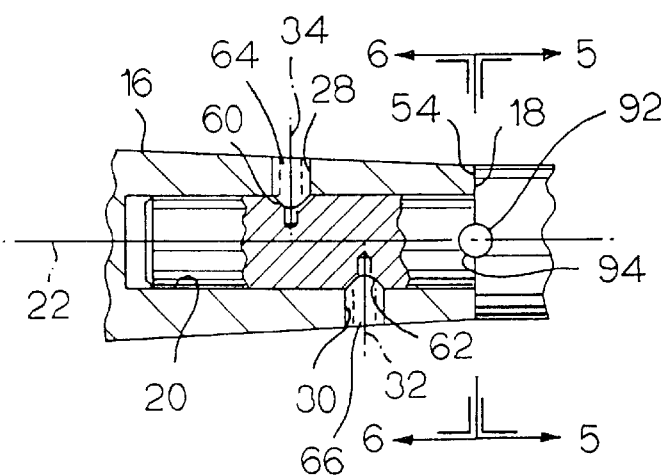
FIG. 3 is a view similar to FIG. 2, but in which the body has been rotated 90 degrees and the shank is shown partially in section.
Figure 7:
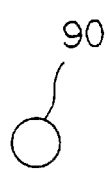
FIG. 7 is an end view of one of the pins.
Figure 8:
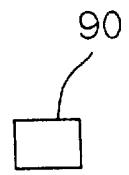
FIG. 8 is an elevational view of one of the pins.

A pair of cylindrical pins (keys) 90 and 92 are received in the opposed channels of the two shoulders. Referring to FIG. 7 and 8, a typical pin 90 has a outer cylindrical diameter that snugly fits in the two opposed channels in the shoulders of the tool body and the shank. When the tool head is mounted on the body with the shank fully received in the shank-receiving opening, as viewed in FIG. 3, the channels tightly embrace the two pins thereby preventing relative rotation between the shank and the body, and permitting the tool to transmit a heavier torque on a high speed machine.

To assemble the tool holder, the inserts are mounted in the usual manner on the outer end of the head. The shank is inserted in bore 20 until the channels mate with the pins (keys) 90 and 92. Preferably, each pin is attached to a channel in either the body or the tool head as by tack welding at 94, as viewed in FIG. 3.

Threaded fasteners 64 and 66 are then screwed into their respective counter-drilled openings to cam the shank until shoulder 54 abuts shoulder 18.

The process is reversed, to remove the head.

Figure 9:
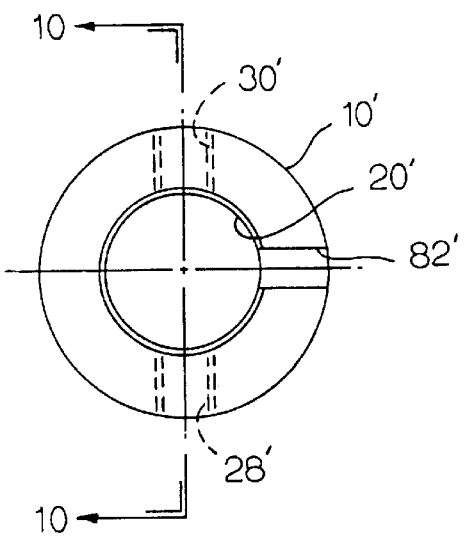
FIG. 9 is a view of a tool body showing the shoulder of an embodiment of the invention using only a single pin.
Figure 10:
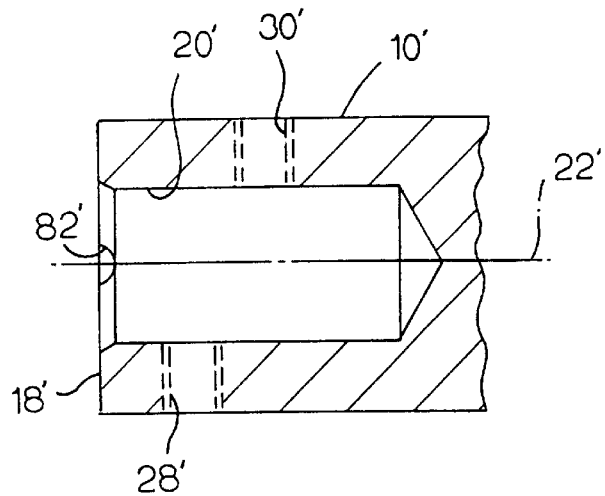
FIG. 10 is a sectional view as seen along lines 10—10 of FIG. 9.
Figure 11:
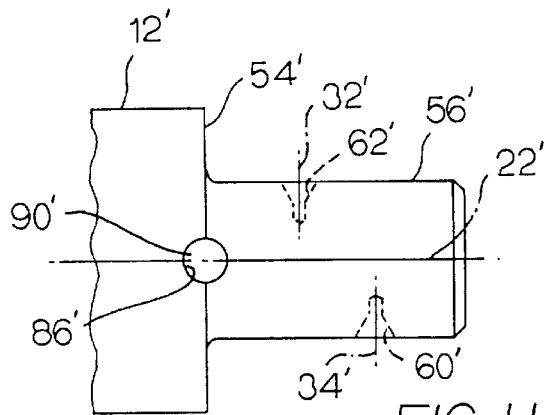
FIG. 11 is a view of a tool shank that may be received in the tool body of FIGS. 9 and 10.
Figure 13:
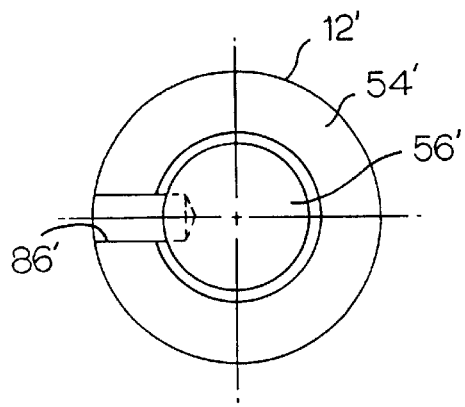
FIG. 13 is a view as seen from the right end of FIG. 11.
Figure 12:
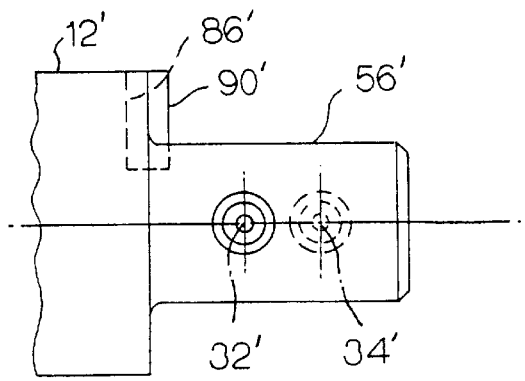
FIG. 12 is a view in which the tool of FIG. 11 has been rotated 90°.

FIGS. 9–11 illustrate another embodiment of the invention in which the primed numbers refer to similar numbers of FIGS. 1–8. Body 10' has a bore 20'. The body has an annular shoulder 54' formed about axis 22'. Head 12' has a shank 56' which is receivable in shank-receiving opening 20' in the tool body.

The body has an annular shoulder 18' formed around shank-receiving opening 20'. The head has an annular opening 54' around shank 56', which seats on shoulder 18' when the shank is received in the shank-receiving opening.

The body has a pair of threaded fastener-receiving openings 28' and 30'. The two openings are formed about parallel axes 32' and 34' which are disposed at right angles to and intersect longitudinal axis 22'. The shank has a pair of counter drilled openings or recesses 60' and 62' which are slightly offset longitudinally from fastener receiving opening 28' and 30' when the shank is fully received in the bore. A pair of socket head fasteners (not shown) are threadably received in openings 28' and 30' in the manner described with reference to the embodiment of FIGS. 1–8.

In this embodiment, shoulder 18' has a single semi-cylindrical channel 82' formed along an axis that intersects the axis of the shank, as shown in FIG. 9. Similarly, the body has a single semi-cylindrical channel 86' which is aligned with channel 82' when the shank is received in the shank-receiving bore and the threaded openings 28' and 30' are aligned with respective countersunk openings 60' and 62'.

A pin 90' is press-fitted into channel 86' and then tack welded in place. When the shank is received in the bore, the pin as seen in FIG. 10, is aligned along an axis disposed at right angles to threaded openings 28' and 30'. When the shank is received in the shank-receiving opening, the shoulders of the tool body and the tool holder will only abut one another when the pin is received in channel 82'. This arrangement ensures that the fastener-receiving opening in the body is aligned with the counter drilled opening in the shank.

Having described my invention, I claim:

1. A tool holder assembly, comprising:

an elongated tool holder body having a longitudinal axis, an end shoulder and an elongated shank-receiving bore extending from said end shoulder along said longitudinal axis;

a tool holder head adapted to support at least one cutting insert, said tool holder head having a cylindrical shank slidably receivable in said shank-receiving bore, and an annular shoulder axially alignable with said end shoulder;

means for biasing said tool holder head along said longitudinal axis so that said annular shoulder has pressure engagement with said end shoulder on the tool holder body;

said biasing means comprising at least two threaded openings in said tool holder body extending normal to said longitudinal axis in a common plane containing said longitudinal axis; said threaded openings being equi-angularly spaced apart in the circumferential direction, said threaded openings also being spaced in the axial direction so that said openings communicate with said bore at axially spaced points therealong;

said shank having at least two frusto-conical recesses adapted to register with said threaded openings when said shank is inserted into said bore;

a threaded fastener threaded into each of said threaded openings to penetrate a respective frusto-conical recess, whereby said tool holder head is biased along said longitudinal axis;

means for transmitting torque between said tool holder head and said tool holder body when said shank is slidably inserted into the bore comprising:
the tool holder head annular shoulder having a first channel having a semi-cylindrical configuration formed alone an axis which intersects and is at right angles to said longitudinal axis,
the tool holder body having a second channel opposing the first channel and formed along an axis which intersects said longitudinal axis; and
a key disposed in said fist channel and said second channel to prevent rotation of the tool holder head with respect to the tool holder body about said longitudinal axis.

2. A tool holder assembly as defined in claim 1, in which the key has a cylindrical configuration.

3. A tool holder assembly as defined in claim 1, in which the key is attached to one of said channels so as to be fixed thereto.

4. A method for forming a tool holder assembly, comprising the steps of:
forming an elongated tool holder body having a longitudinal axis, an end shoulder and an elongated shank-receiving bore extending from said end shoulder along said longitudinal axis;
forming a tool holder head adapted to support at least one cutting insert: said tool holder head having a cylindrical shank slidably receivable in said shank-receiving bore, and an annular shoulder axially alignable with said end shoulder;
biasing said tool holder head along said longitudinal axis so that said annular shoulder has pressure engagement with said end shoulder on the tool holder body by using at least two threaded openings in said tool holder body extending normal to said longitudinal axis in a common plane containing said longitudinal axis; spacing said threaded openings equi-angulary apart in the circumferential direction, spacing said threaded openings in the axial direction so that said threaded openings communicate with said bore at axially spaced points therealong;
registering two frusto-conical recesses in said shank with said threaded openings when said shank is inserted into said bore;
threading a fastener into each of said threaded openings to penetrate a respective frusto-conical recess, whereby said tool holder head is biased along said longitudinal axis;
transmitting rotational motion between said tool holder head and said tool holder body when said shank is slidably inserted into the bore by forming a first channel in the tool holder head annular shoulder along an axis which intersects and is at right angles to said longitudinal axis;
forming a second channel in the tool holder body end shoulder opposing the first channel in the tool holder head annular shoulder alone an axis which intersects and is at right angles to said longitudinal axis;
disposing a key in said first and second channels to prevent rotation of the tool holder head with rest to the tool holder body about said longitudinal axis as the tool holder body is being rotated about said longitudinal axis,
forming a first companion channel in said tool holder head annular shoulder along an axis which intersects and is at right angles to said longitudinal axis;
forming a second companion channel in the tool holder body end shoulder opposing the first companion channel along an axis which intersects and is at right angles to said longitudinal axis; and
disposing a second key in said first and second companion channels to prevent rotation of the tool holder head with respect to the tool holder body about said longitudinal axis.

5. A tool holder assembly, comprising:
an elongated tool holder body having a longitudinal axis, an and shoulder and an elongated shank-receiving bore extending from said end shoulder along said longitudinal axis;
a tool holder head adapted to support at least one cutting insert, said tool holder head having a cylindrical shank slidably receivable in said shank-receiving bore, and an annular shoulder axially alignable with said end shoulder;
means for biasing said tool holder head along said longitudinal axis so that said annular shoulder has pressure engagement with said end shoulder on the tool holder body;
said biasing means comprising two threaded openings in said tool holder body extending normal to said longitudinal axis in a common plane containing said longitudinal axis; said threaded openings being spaced about one hundred eighty degrees apart in the circumferential direction, said threaded openings also being spaced in the axial direction so that said openings communicate with said bore at axially spaced points therealong;
said shank having two frusto-conical recesses adapted to register with said threaded openings when said shank is inserted into said bore;
a threaded fastener threaded into each of said threaded openings to penetrate a respective frusto-conical recess, whereby said tool holder head is biased along said longitudinal axis;
means for transmitting torque between said tool holder head and said tool holder body when said shank is slidably inserted into the bore comprising:
the tool holder annular shoulder having a first channel;
the tool holder body having a second channel opposing the first channel;
a key disposed in said first and second channels to prevent rotation of the tool holder head with the tool holder body about said longitudinal axis; and
the tool holder annular shoulder having a first companion channel therein, the first companion channel having a semi-cylindrical configuration formed along an axis that is aligned with the first channel of the tool holder head annular shoulder, and which intersects the longitudinal axis of said body, and the tool holder body having a second companion channel aligned with the second channel of the tool holder body, on opposite sides of the shank-receiving opening, and formed along an axis which intersects and is at right angles to said longitudinal axis openings.

6. A tool holder assembly as defined in claim 5, in which the first companion channel opposes the second companion channel when the shank is inserted into said bore, and including a second key disposed in said first companion channel and said second companion channel to prevent rotation of the tool holder head with respect to the tool holder body about said longitudinal axis.

* * * * *